United States Patent [19]

Brownlow et al.

[11] 4,440,831
[45] Apr. 3, 1984

[54] ZINC SILICATE PHOSPHOR PARTICLES AND METHOD FOR MAKING THEM

[75] Inventors: James M. Brownlow, Crompond; Ifay F. Chang, Chappaqua, both of N.Y.

[73] Assignee: International Business Machines Corporation, Armonk, N.Y.

[21] Appl. No.: 280,147

[22] Filed: Jun. 30, 1981

[51] Int. Cl.³ .................. C09K 11/10; C09K 11/16; C09K 11/20; H01J 29/26

[52] U.S. Cl. .................. 128/404; 252/301.6 F; 427/64; 427/68

[58] Field of Search .................. 428/404; 427/64, 68; 252/301.6 F

[56] References Cited

U.S. PATENT DOCUMENTS 2,920,003  1/1960  Davis .................................. 428/404
3,069,292 12/1962  Alexander et al. .................. 428/404
3,420,691  1/1969  Thomas et al. ..................... 428/404
3,939,377  2/1976  Ignasiak ............................ 428/404
4,172,920 10/1979  Konda et al. ...................... 428/404
4,287,229  9/1981  Watanabe et al. .................. 428/404
4,339,501  7/1982  Inoue et al. ....................... 428/404

Primary Examiner—J. C. Cannon
Attorney, Agent, or Firm—Graham S. Jones, II

[57] ABSTRACT

Improved zinc silicate phosphor particles are made by using silicic acid particles in the range from 0.7 to 10 micrometers coated with $Mn_2O_3 \cdot xH_2O$ and then a layer of ZnO particles about an order of magnitude smaller which are fired to form the phosphors. The particle size is held within the range preferred and preferably is even narrower. The particles are not milled or mechanically crushed. Instead, the ZnO powder prevents agglomeration during firing. Baths are provided for formation of the particles prior to firing. Brightness and persistance are improved over conventional phosphors.

17 Claims, 15 Drawing Figures

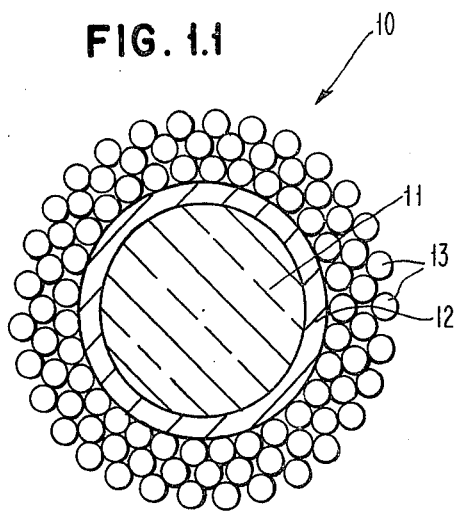
FIG. 1.1
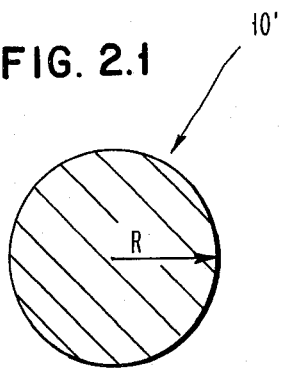
FIG. 2.1
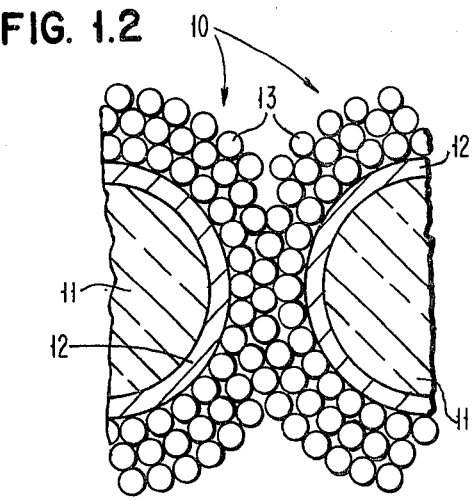
FIG. 1.2
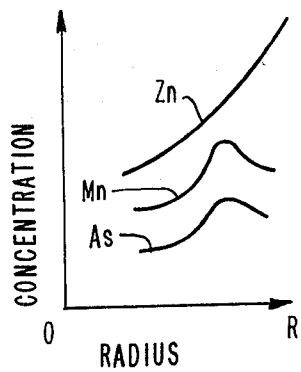
FIG. 2.2

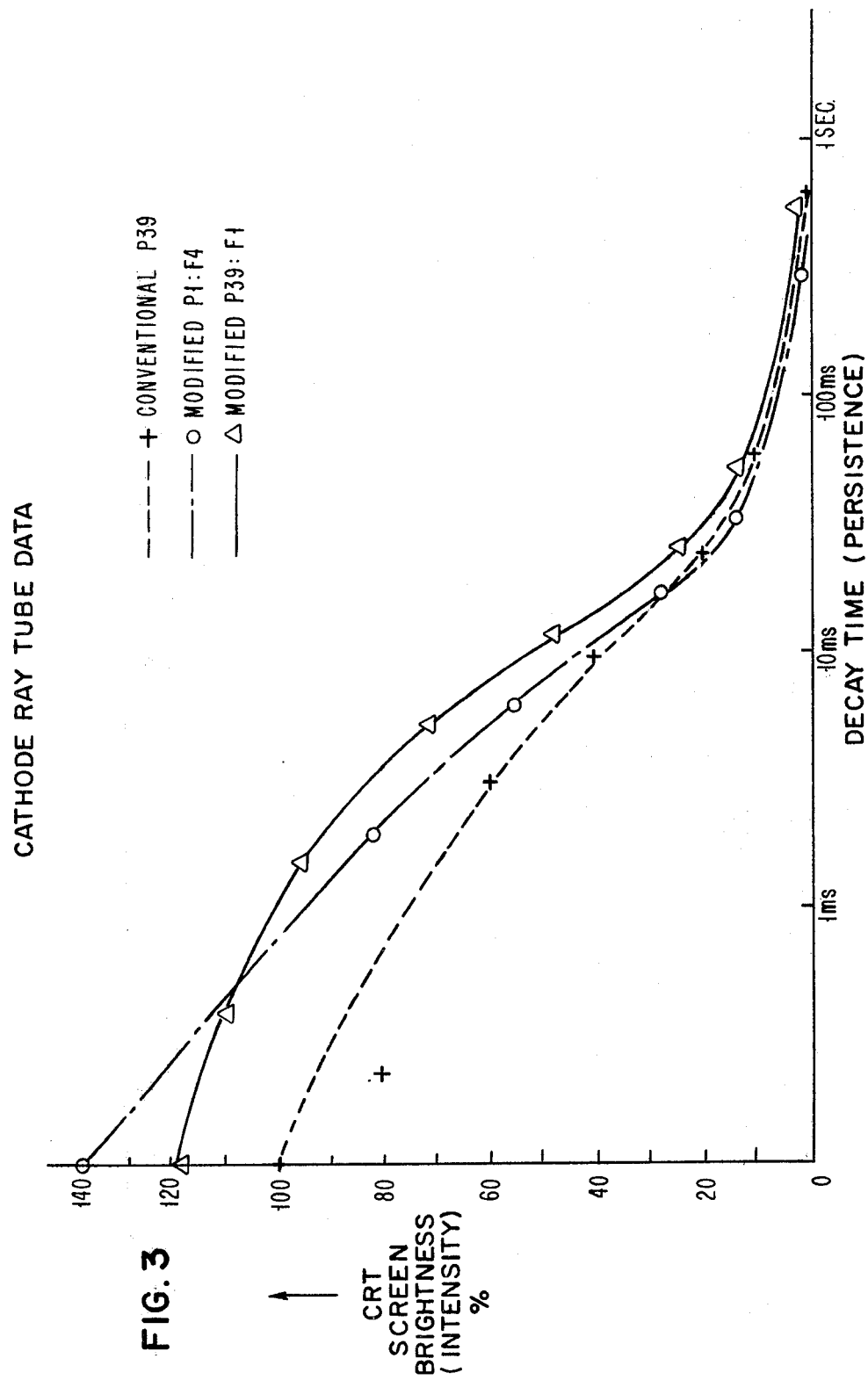

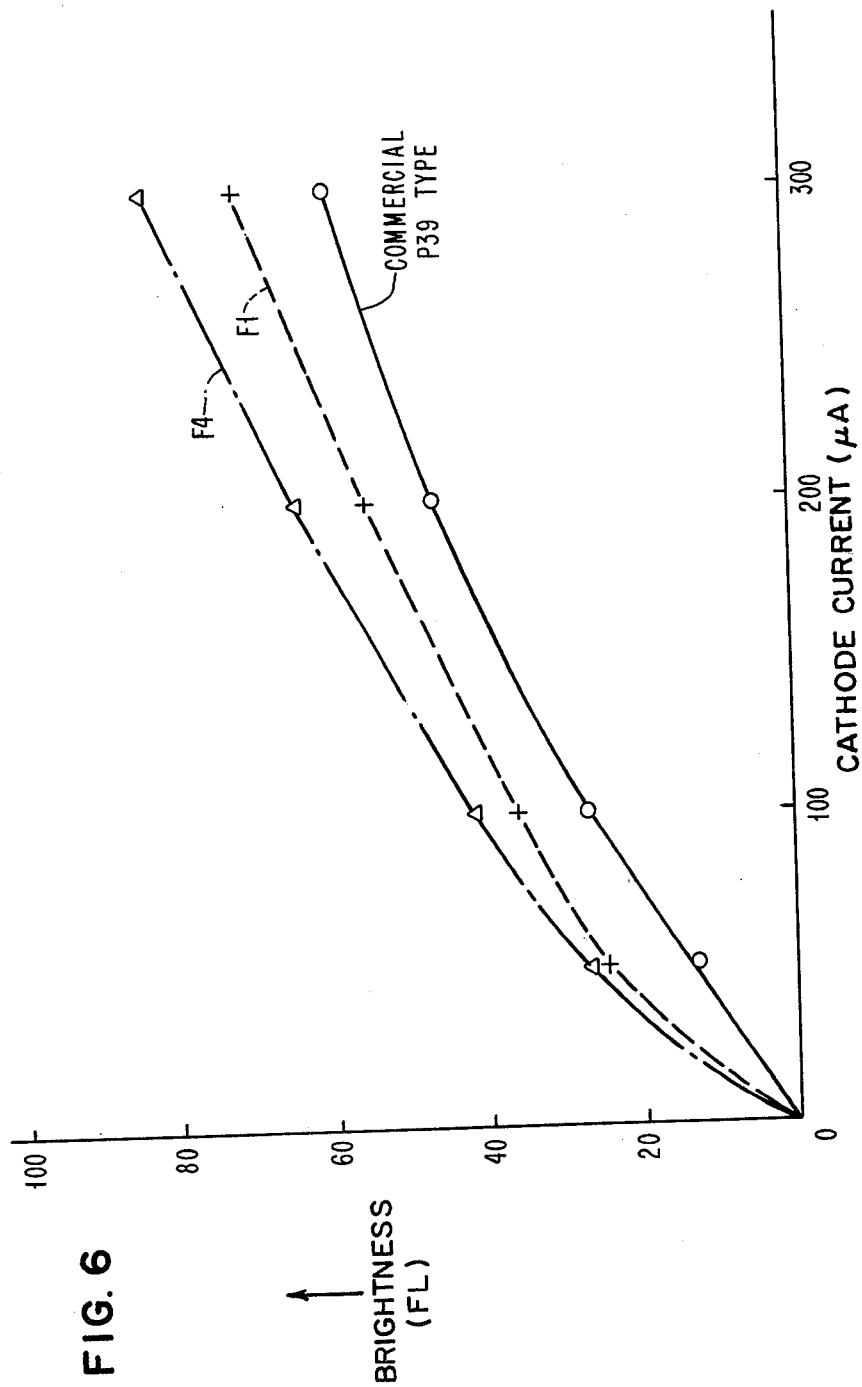

FIG. 7.1
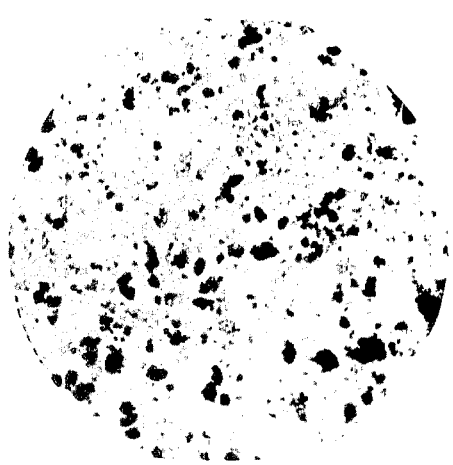
|←——300 μm——→|
FIG. 7.2
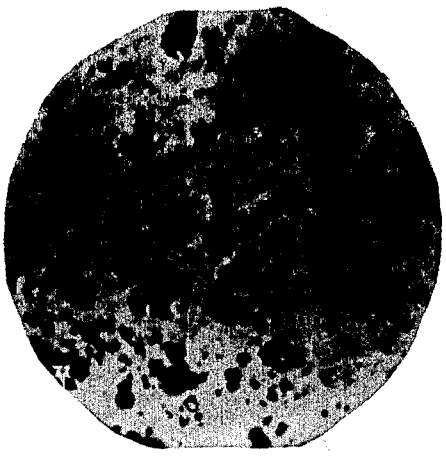
|←——150 μm——→|
FIG. 8.1
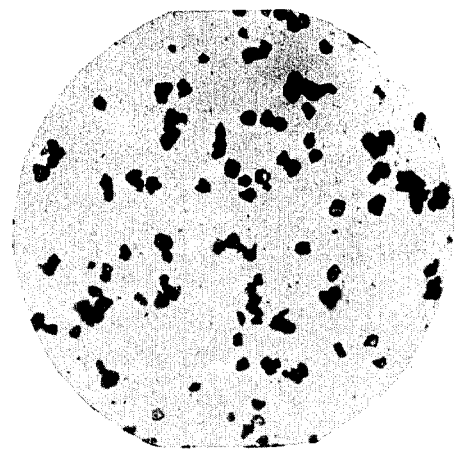
|←——300 μm——→|
FIG. 8.2
|←——150 μm——→|

ZINC SILICATE PHOSPHOR PARTICLES AND METHOD FOR MAKING THEM

BACKGROUND OF THE INVENTION

1. Field of the Invention

This invention relates to improved zinc silicate particles and a method of forming such particles. More particularly this invention relates to an improved method of formation of such particles from silicic acid, and to the improved particles produced by the method.

2. Discussion of References

U.S. Pat. No. 2,656,320 of Nagy et al for "Zinc Silicate Phosphor", combines silicic acid and zinc oxide with magnesium (nitrate, carbonate or hydroxide) as an activator. The purpose is to form an orthosilicate as opposed to a metasilicate. Manganese is added (preferably nitrate) and the resulting material is ball-milled wet for one hour at 130° C. until dehydrated or ball-milled dry for two hours and then heated at 1240° C. for one hour. The product is screened through a 100-mesh screen and refired for one to three hours at 1240° C. Alternatives to magnesium nitrate, as the activator, are zirconium oxide or the combination of magnesium and zirconium oxides.

U.S. Pat. No. 2,845,564 of Herold for "Cathodoluminescent Phosphors and Devices" describes preparation of luminescent material from magnesium oxide (as the oxide), cadmium oxide (as the carbonate), zinc oxide (as the oxide), silicon dioxide (as silicic acid), manganese (as the sulfate) and flux (as cadmium chloride). The material is ball-milled with water for four to twelve hours, dried and then fired at 1050° C. in air for four hours. The composition of the product is 5MgO.2-CdO.ZnO.7SiO$_2$:0.04 Mn. Manganese is employed as an activator.

U.S. Pat. No. 3,766,084 of Malarkey for "Method of Preparing an Ultraviolet Emitting Phosphor" employs silicic acid, SrCO$_3$, SrF$_2$, ZnO, and PbO, ball-milled in dry powder form for fifteen to twenty hours, or wet milled for two hours after adding acetone. The dry product, after milling, is fired at 1275° to 1325° C.

U.S. Pat. No. 2,274,272 of Leverenz for "Luminescent Material" describes preparation of a luminescent material by precipitating beryllium carbonate, zinc carbonate, and manganese carbonate from a nitrate solution of those metals by adding ammonium carbonate. The mixed material is then precipitated onto very finely divided SiO$_2$ particles, which can be in a colloidal suspension. The mixture is dried and heated to 700° to 1600° C. with an optimum value of 1150° C. A temperature of 1200° C. is mentioned in an example. The phosphor produced is a 40% Be, 60% Zn phosphor. The zinc is added before the ammonium carbonate is added and before the precipitation of the solution onto the particles of silica.

U.S. Pat. No. 2,314,699 of Hale for "Luminescent Material" describes use of zinc oxide, dispersed in a silicate solution precipitating the silica on the zinc oxide and filtering out the zinc oxide particles with their precipitated silica coating. The filtered particles are suspended in a dilute solution of manganese nitrate. The manganese may then be precipitated on the silica layer in the form of carbonate, sulfide, oxalate, oxide or phosphate. Manganese can be precipitated as carbonate by adding ammonium carbonate, or ammonium hydroxide.

U.S. Pat. No. 2,110,162 of Leverenz for "Luminescent Material" describes use of zinc nitrate and copper nitrate which are warmed and mixed together (magnesium can be substituted for the zinc); silica particles less than 100 micrometers in diameter are obtained by ball-milling or grinding and passing the material through a 400-mesh screen. Alternatively, colloidal SiO$_2$ can be used instead of the powdered SiO$_2$. The Zn and Cu are precipitated as carbonates, oxalates, sulfides, hydroxides or phosphates by adding ammonium carbonate or carbamate, or by adding ammonium hydroxide plus saturation with carbon dioxide. The ammonium nitrate is removed by elutriation or washing. The material is dried and then heated to 900° to 2800° C., 5 to 150 minutes.

Additional U.S. Patents include:
Yocom et al. U.S. Pat. No. 3,208,950
Glemze et al. U.S. Pat. No. 3,541,019
Froelich U.S. Pat. No. 2,597,631
Leverenz U.S. Pat. No. 2,457,054
Moore U.S. Pat. No. 2,238,026
Batchelor U.S. Pat. No. 2,124,225
Leverenz U.S. Pat. No. 2,306,270

SUMMARY OF THE INVENTION

An object of this invention is to provide phosphor materials with greater persistence for a given level of brightness.

Another object of this invention is to provide a greater brightness for a given level of persistence.

An additional object of this invention is to provide phosphor materials with a size range which is narrow and excluding extremely fine particles of phosphor material.

Still another object of the present invention is to provide an improved chemistry of phosphors.

A further object of this invention is to provide a processing environment more conducive to improved phosphor performance.

An additional object of this invention is to avoid degradation of phosphor performance by elimination of grinding, milling, and the like to control particle size of phosphors.

An additional objective of this invention is to provide phosphors with longer persistence and higher light output for a given level of stimulation thereof for the purpose of saving circuit cost. It is also desirable to improve screen fabrication yield by using phosphors with uniform particle size distribution. It is also desirable to use phosphor particles within a narrow particle size distribution range for specific applications such as cathode ray tube displays, cathode ray tube scanners and cathode ray tube printers, etc.

As employed herein "Persistence" is also referred to as "$\Sigma \tau$" or the sum of "$\tau$", which is the decay time. "$\Sigma \tau$"$=\tau_{10}+0.1\tau_1+0.01\tau_{0.01}$, where $\tau_{10}=$time to decay to 10% of original brightness, $\tau_1=$time to decay to 1% of original brightness, and $\tau_{0.01}=$time to decay to 0.01% of original brightness.

In accordance with this invention, an improved zinc silicate phosphor comprises particles with an inner core of silicon and oxygen rich material, an intermediate region rich in manganese oxides, and an outer portion rich in zinc and oxygen. Preferably, the intermediate region contains magnesium and arsenic, and the inner core is rich in silicon dioxide. The intermediate region is rich in manganese, magnesium, arsenic and oxygen, and the outer portion is rich in zinc and oxygen.

Preferably, the composition of the above phosphor particles comprises compounds in ratios in accordance with the ranges listed as follows:

ZnO: 2 moles
$SiO_2$: 1.60–1.65 moles
MgO: 0–0.11 moles
MnO: 0.006–0.014 moles
$As_2O_3$: 285–1120 parts per million;

Or as follows:
ZnO: 2 moles
$SiO_2$: 1.1–1.75 moles
MgO: 0–0.11 moles
MnO: 0.0025–0.02 moles
$As_2O_3$: 0–2000 parts per million;

Or in the ratios indicated:
ZnO: 1
$SiO_2$: 0.55 to 0.875
MgO: 0 to 0.06
MnO: 0.001 to 0.01
$As_2O_3$: 0–2000 parts per million;

Or in the alternative ratios indicated:
ZnO: 1
$SiO_2$: 0.8–0.83
MgO: 0–0.06
MnO: 0.003 to 0.007
$As_2O_3$: 285–1120 parts per million.

This invention comprehends a method of fabricating a phosphor, the improvement comprising:

(a) providing particles of silicic acid within a predetermined size range;

(b) mixing the silicic acid particles in an aqueous solution of Mn, Mg and As cations and anions selected from the group consisting of $NO_3$, $SO_4$, OH, and Cl, (c) adding zinc containing particles, drying, and (d) firing the product of step (c) whereby a reacted oxide product is produced.

In the instant method of fabricating a phosphor, the improvement comprises:

(a) providing particles of silicic acid to sizes on the order of 1 micrometer and larger;

(b) mixing the silicic acid particles in an aqueous solution of Mn, Mg and As cations and highly active anions, (c) adding zinc oxide particles to the result of step (b), drying, and (d) firing the product of step (c), whereby a reacted oxide product is produced.

Preferably, the solution in step (b) includes $NH_4OH$. It is preferred that the product of step (b) is oxidized to form a precipitate containing Mn to coat the exterior surface of the silicic acid particles prior to step (c).

Preferably, particles of zinc oxide are applied to provide a coating on the particles in step (c), whereby firing of the particles with the coating inhibits sintering of the particles together during firing in step (d). The particles of zinc oxide should be an order of magnitude smaller than the particles of silicic acid applied to the particles of silicic acid to provide a coating on the particles of step (b) in step (c), whereby firing of the particles with the coating inhibits sintering of the particles together during firing in step (d).

Preferably, the product of step (b) is oxidized to form a precipitate of $Mn_2O_3 \cdot xH_2O$ to coat the exterior surface of the silicic acid particles prior to step (c).

It is preferred that silicic acid particles are in the size range between about 0.7 micrometer and 10 micrometers. The solution in step (b) comprises $MnSO_4 \cdot H_2O$, $As_2O_3$, $HNO_3$ and magnesium with an anion, and the firing in step (d) is performed for between about 6 and 36 minutes at a temperature on the order of 1180° C. Preferably, the atmosphere employed in step (d) comprises wet nitrogen gas.

Preferably, aqueous solution in step (b) comprises a solution $A_n$ from the table which follows:

| | SOLUTION $A_n$ | | | |
|---|---|---|---|---|
| | Quantities | | | |
| Components | $A_1$ | $A_2$ | $A_3$ | $A_4$ |
| $H_2O$ (cc) | 13.3 | 13.3 | 13.3 | 13.3 |
| Mg Acetate (g) | 0.79 | 0 | 0.79 | 0 |
| $Mg(NO_3) \cdot 6H_2O$ (g) | 0 | 1.0 | 0 | 0 |
| $NH_4OH$ (cc) | 1.0 | 1.0 | 1.0 | 1.0 |
| $As_2O_3$ (Stir 2 hrs.) | 0.00073 | 0.00073 | 0.0002 | 0.0002 |
| $HNO_3$ (cc) | 1.0 | 1.0 | 1.0 | 1.0 |
| $MnSO_4 \cdot H_2O$ (g) | 0.0324 | 0.0324 | 0.0816 | 0.0816 |
| Stir (hrs.) | 2 | 2 | 2 | 2 | and it is preferred that the product of step (b) is oxidized to form a precipitate containing Mn with addition of solution B which follows:

| SOLUTION B | |
|---|---|
| $NH_4OH$ (cc) | 3.5 |
| $H_2O_2$ (cc) | 1.5 |

BRIEF DESCRIPTION OF THE DRAWINGS

FIG. 1.1 shows a sectional view of a dried but unfired particle-size unit ready for firing to form a phosphor in accordance with this invention.

FIG. 1.2 shows fragments of a pair of units of the kind shown in FIG. 1.1 juxtaposed.

FIG. 2.1 shows a section of a phosphor particle formed by reaction during firing from the unit shown in FIG. 1.1.

FIG. 2.2 shows a curve of concentration of elements in the phosphor particle of FIG. 2.1 as a function of radial distance from the center of the particle of FIG. 2.1.

FIG. 3 is a graph of cathode ray tube screen brightness as a function of decay time or persistence.

FIG. 6 is a set of curves of brightness of phosphors as a function of cathode current in a cathode ray tube.

FIG. 7.1 is a photomicrograph of several commercially available phosphor particles magnified to the scale shown.

FIG. 7.2 is a similar photomicrograph to FIG. 7.1 for a greater degree of magnification as indicated.

FIG. 8.1 is a photomicrograph of a phosphor made in accordance with this invention to the degree of magnification of FIG. 7.1.

FIG. 8.2 is a photomicrograph similar to FIG. 8.1 with a greater degree of magnification as in FIG. 7.2.

PREFERRED EMBODIMENT OF THE INVENTION

Figure 4:
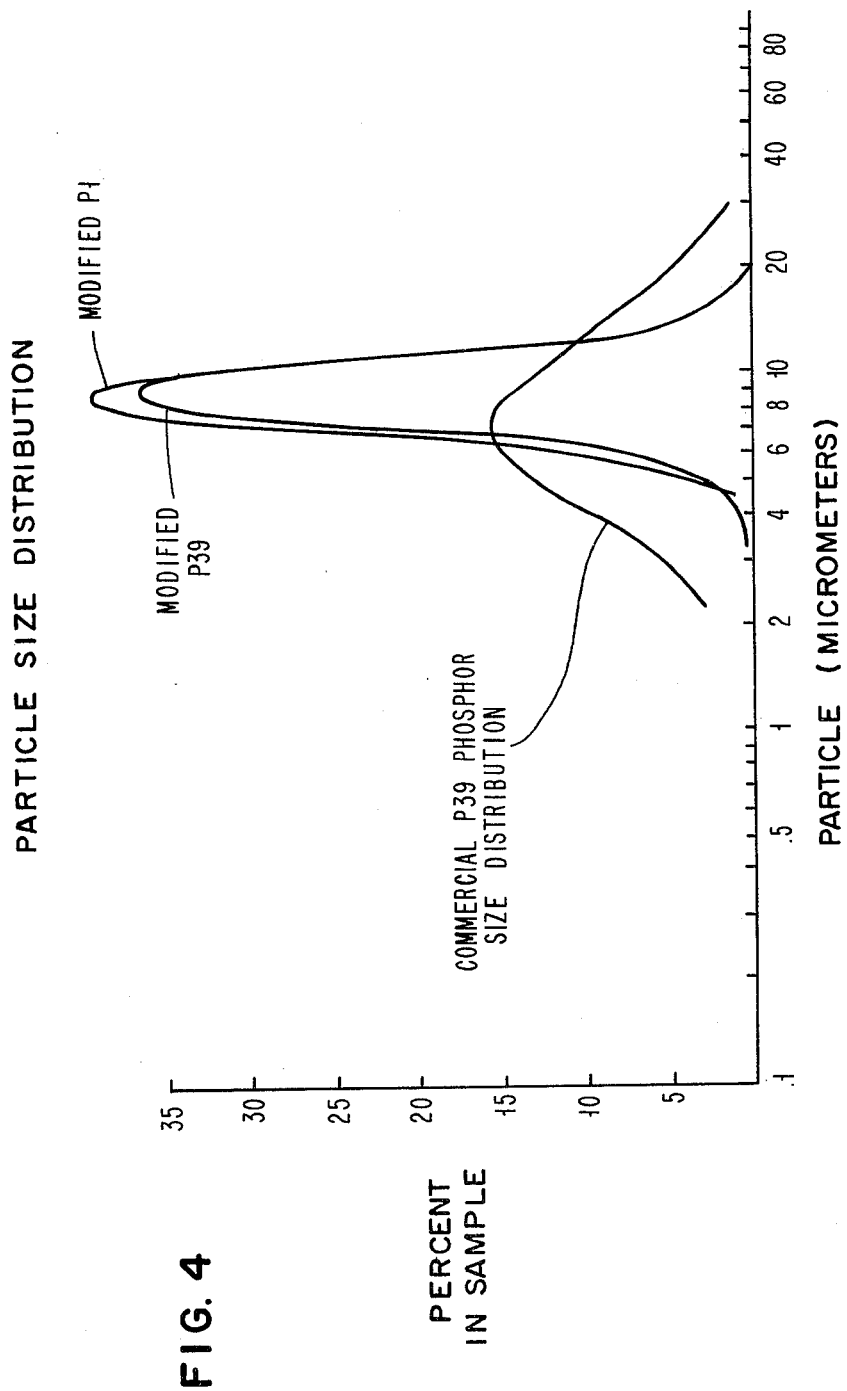
FIG. 4 is the particle size distribution curve for several phosphors with the narrower distribution provided by phosphors in accordance with this invention.

FIG. 1.1 shows a sectional view of a dried but unfired, particle-size unit 10 which is transformed by firing into a phosphor particle 10' of FIG. 2.1 made in accordance with this invention. Each unit 10 is composed at its core of a particle 11 of silicic acid surrounded by a precipitated film 12 which is coated with a layer of powder 13. The film 12 is composed of a brown precipitate which deposits upon the silicic acid particle 11. The composition of film 12 is a brown precipitate of $Mn_2O_3.xH_2O$ which deposits upon particle 11. The silicic acid of particle 11 is $SiO_2.xH_2O$, where x is preferably a fraction less than 1. The layer of powder 13 is composed of ZnO particles about an order of magnitude smaller than the silicic acid particles 11. When a batch of particle-size unfired units 10 is fired, each unit reduces in size as gases and water are driven off. Thus, the size of each phosphor particle 10' produced from a unit 10 is roughly of the same physical size as the particle 11 of silicic acid at the core of the unit 10. While unit 10 and particle 10' are shown in somewhat idealized form to be generally spherical, it is a fact that the shapes of the units 10, particles 11 and phosphor particles 10' are random and irregular. The cores of units 10, particles 11, preferaly fall within a narrow range of sizes in order to produce enhanced performance of the phosphors produced.

FIG. 1.2 shows portions of two units 10 with the outer surfaces of the layers of powder 13 of each unit coming into close, intermingling physical contact. The purpose of the drawing is to focus the attention of the reader upon the fact that the powder in the two layers 13 serves the purpose of preventing the agglomeration of the particle size units 10 during firing.

In other words, the units 10 do not sinter together during firing because of the presence of the layer of powder 13. The dry ZnO powder 13 is analogous to dry flour used in baking and cooking. For example, meat balls coated with batter are then coated with dry flour to prevent them from joining during frying. Also, wet pieces of dough are coated with flour prior to cooking to prevent them from bonding together. The layers 13 of the two adjacent particle size units 10 are in physical contact but the zinc oxide is drawn into the inner portions of the units 10 as they are fired. The net result is that the units 10 do not bond together as they are fired into phosphor particles 10' which are smaller than the units 10 in general. The prevention of such bonding assures that the variation in the size of phosphor particles 10' is held to a minimum. An advantage of this process is that grinding, which is deleterious to the ultimate phosphor particles 10', and, alternatively, breaking of particles 10' to obtain desired particle sizes is avoided.

Process of Formation of Particles

1. A source of silicic acid particles 11 for the cores of units 10 is Fisher A288 or A945 made by Fisher, Inc., which is $SiO_2$ hydrated by some bound water. Improved light output results when the particles 11 of silicic acid range in size between about 0.7 and 10 micrometers.

2. A mixture is prepared using silicic acid particles 11 and an acidic solution $A_n$ (where n indicates the specific mix for a particular example) is prepared using silicic acid particles 11 and an acidic solution of $MnSO_4.H_2O$, $As_2O_3$, $HNO_3$, $NH_4NO_3$ in water (referred to as SOL $A_n$ throughout the text below).

3. The brown precipitated film 12 of $Mn_2O_3.xH_2O$ forms on each silicic acid particle 11 after a second solution (SOL B) containing $H_2O_2$ and $NH_4OH$, or ammonium carbonate, etc., is added to the mixture in step (2).

4. The submicrometer size particles of ZnO powder layer 13 are added to overcoat the brown Mn compound film 12 precipitated on the silicic acid particles 11. The size of the ZnO particles 13 is about an order of magnitude smaller than the silicic acid particles 11. It is important not to grind the particles 11, 12 of steps (2) and (3) above. Stirring in plastic jars is used.

5. The product 10 of step (4) is dried by heating or freeze-drying. Heating can be provided at 100° C. or above. Next, the dried particles 10 are fired in wet nitrogen gas (with or without an added fraction of 1 or 2% of hydrogen gas) at 1180° C. for six to thirty-six minutes. The process of firing retains most of the manganese in the divalent state and raises the light output provided by the resulting phosphor particles 10' produced by this process, as compared with the light output obtained for firing in air. Firing time must be long enough only to amalgamate or react all of the ZnO particles into the phosphor particles 10', because the longer the firing time the greater the loss in decay time.

6. A beneficial addition to the phosphor 10' is magnesium oxide which is provided by means of adding Mg in the form of Mg acetate or Mg $(NO_3)_2.6H_2O$ to the solution $A_n$ for the purpose of providing an improved P39 type phosphor in accordance with this invention. The amount of resulting magnesium oxide in the phosphor particles 10' is in the range from about 0.06 to 0.15 moles per one mole of $Zn_2Si_{1.5}O_5$ in the phosphor particle 10'. In the case of the improved P1 type phosphor made in accordance with this invention, we have not found that the addition of the magnesium to the solution $A_n$ and the phosphor particles 10' is advantageous.

7. The resultant powder of phosphor particles 10' is of suitably fine particle size after firing, and thus it does not require any milling which should be avoided since it is damaging to the phosphor particles 10' and reduces their advantageous qualities.

8. The improved result in brightness versus decay time for the phosphor particles 10' over the commercially available conventional P39 phosphors is shown in FIG. 3. Data for modified P1(F4) phosphors and modified P39(F1) phosphors used in a cathode ray tube is shown on FIG. 3. The improvement is believed to be due to the novel provision of a steep chemical gradient in each phosphor particle 10' as illustrated by FIG. 2.2 where the Mn, Zn, and As concentration of the particles is greatest at the outer surface of each particle 10', and least at the center. This is illustrated by FIG. 2.1 where the radius R is indicated as increasing from the effective center of the particle 10' and extending by radius R out from the center to the surface of the particle 10'.

Experiments have been performed which show that the improved persistence of the phosphors is degraded as the firing time is increased beyond the optimum value when the zinc oxide is all reacted or amalgamated with the particles 10' of phosphor material. (See TABLE X and FIG. 9.) Thus, it is manifest that as the firing extends beyond the optimum time, the elements such as Mn, Zn, As (and Mg when used) are caused to diffuse even further into the interior of the particle 10'. This tends to reduce the desired steep concentration gradient.

Our experiments have shown that as the time of firing increases the phosphor degrades in persistence until it is quite comparable to the persistence of the commercially available phosphors in which there is apparently uniformity of chemical composition throughout the particles of phosphor material.

Another improvement in the current phosphor material is the provision of uniform particle size as illustrated by FIG. 4 where the lower wider curve for P39 commercial phosphors shows its broad range of percentages of sizes. While the much smaller particles below 2 micrometers in size were not measured, it is apparent from the curve that there were numerous such particles which we have found to degrade the performance of the phosphors by reducing the brightness greatly. The modified P1 and P39 type materials greatly improve the narrow range of the particle size and concomitantly improve the performance of the phosphor particles 10'.

TABLE I

| Components | Quantities | | | |
|---|---|---|---|---|
| | $A_1$ | $A_2$ | $A_3$ | $A_4$ |
| SOLUTION $A_n$ (SOL $A_n$) | | | | |
| $H_2O$ (cc) | 13.3 | 13.3 | 13.3 | 13.3 |
| Mg Acetate (g) | 0.79 | 0 | 0.79 | 0 |
| Mg $(NO_3)_2 \cdot 6H_2O$ (g) | 0 | 1.0 | 0 | 0 |
| $NH_4OH$ (cc) | 1.0 | 1.0 | 1.0 | 1.0 |
| $As_2O_3$ (Stir 2 hrs.) (g) | 0.00073 | 0.00073 | 0.0002 | 0.0002 |
| $HNO_3$ (cc) | 1.0 | 1.0 | 1.0 | 1.0 |
| $MnSO_4 \cdot H_2O$ (g) | 0.0324 | 0.0324 | 0.0816 | 0.0816 |
| Stir (hrs.) | 2 | 2 | 2 | 2 |
| SOLUTION B (SOL B) | | | | |
| $NH_4OH$ (cc) | | | 3.5 | |
| $H_2O_2$ (cc) | | | 1.5 | |

EXAMPLE I

FORMULA F1 PHOSPHOR (MODIFIED P39 TYPE)

A. Formula F1 phosphors are made by preparing the solution $A_1$ in step A.

B. In step B the product of step A is combined with four grams of silicic acid particles 11 ($SiO_2 \cdot xH_2O$), with the particle size distribution curve centered at about 10 micrometers. The material is stirred for about ten minutes.

C. The solution SOL B is added to the product of step B and the new mixture is stirred for ten minutes while the Mn compound precipitates forming layer 12 on each of the silicic acid particles 11.

D. The particles 11 coated with layer 12 and the remainder of the product of step C are combined with 5.3 g of zinc oxide powder (of layer 13) and the resulting particle sized units 10 are stirred for twenty minutes.

EXAMPLE II

FORMULA F2 PHOSPHOR (MODIFIED P39 TYPE)

A. Formula F2 phosphors are made by preparing solution $A_2$ in step A.

B. In step B the product of step A is combined with four grams of silicic acid particles with the particle size distribution centered at about ten micrometers. The material is stirred for ten minutes.

C. In step C, SOL B is added to the product of step B and stirred for ten minutes.

D. About 5.3 g of ZnO is added to the product of step C and stirred for about twenty minutes.

EXAMPLE III

FORMULA F3 PHOSPHOR (MODIFIED P1 TYPE)

A. Formula F3 phosphors are made by preparing solution $A_3$ in step A.

B. In step B the product of step A is combined with four and 12/100 grams of silicic acid particles with the particle size distribution curve centered at about ten micrometers. The material is stirred for ten minutes.

C. In step C, SOL B is added to the product of step B and stirred for ten minutes.

D. About 5.7 g of ZnO is added to the product of step C and stirred for about twenty minutes.

EXAMPLE IV

FORMULA F4 PHOSPHOR (MODIFIED P1 TYPE)

A. Formula F4 phosphors are made by preparing the solution $A_4$ in step A.

B. In step B, the product of step A is combined with four grams of silicic acid particles 11 with the particle size distribution curve centered at about ten micrometers. The material is stirred for ten minutes.

C. In step C, SOL B is added to the product of step B and stirred for ten minutes.

D. About 5.7 g of ZnO is added to the product of step C and stirred for about twenty minutes.

TABLE II below presents EXAMPLES I-IV in tabular form:

TABLE II

| STEP | | F1 | F2 | F3 | F4 |
|---|---|---|---|---|---|
| A | SOL $A_n$ | SOL $A_1$ | SOL $A_2$ | SOL $A_3$ | SOL $A_4$ |
| B | $SiO_2 \cdot H_2O$ (g) | 4 | 4 | 4.12 | 4.0 |
| | stir | 10" | 10" | 10" | 10" |
| C | | SOL B | SOL B | SOL B | SOL B |
| D | ZnO (g) | 5.3 | 5.3 | 5.3 | 5.3 |
| | stir | 20" | 20" | 20" | 20" |

TABLE III presents the composition of the phosphors produced by EXAMPLES I-IV plus ranges of composition of phosphors made in accordance with this invention.

TABLE III

| REACTION PRODUCT: PHOSPHOR (AFTER FIRING) | | | | | |
|---|---|---|---|---|---|
| FORMULA | ZnO* moles | $SiO_2$ moles | MgO moles | MnO moles | $As_2O_3$ ppm |
| F1 | 2 | 1.65 | 0.11 | 0.0061 | 1120 |
| F2 | 2 | 1.65 | 0.11 | 0.0061 | 1120 |
| F3 | 2 | 1.60 | 0.11 | 0.0137 | 285 |
| F4 | 2 | 1.60 | 0 | 0.0137 | 285 |
| Optimum | | | | | |

TABLE III-continued

| | REACTION PRODUCT: PHOSPHOR (AFTER FIRING) | | | | |
|---|---|---|---|---|---|
| FORMULA | ZnO* moles | SiO$_2$ moles | MgO moles | MnO moles | As$_2$O$_3$ ppm |
| Ranges | | | | | |
| Low | 2 | 1.60 | 0 | 0.0061 | 285 |
| High | 2 | 1.65 | 0.11 | 0.0137 | 1120 |
| Workable Ranges | | | | | |
| Low | 2 | 1.1 | 0 | 0.0025 | 0 |
| High | 2 | 1.75 | 0.11 | 0.02 | 2000 |

*ZnO is held constant in this table while the other ingredients are varied to obtain the desired results.

The brightness of the F1 and F2 phosphors made in accordance with this invention for comparable persistence times are substantially higher than commercial P39 phosphors or about 30% brighter as shown in TABLE IV. F3 and F4 are able to provide 25% longer decay times at the same brightness than commercial P1, or 20–30% more brightness for the same decay time.

TABLE IV

| PHOSPHOR | I (BRIGHTNESS) % | PERSISTENCE $\Sigma\tau$ MILLISECONDS |
|---|---|---|
| Commercial P39 | 80 | 45 |
| F1 (Modified P39) | 100 | 45 |
| F2 (Modified P39) | 100 | 43 |
| Commercial P1 | 130 | 30 |
| F3 (Modified P1) | 120 | 37 |
| F4 (Modified P1) | 130 | 37.5 |

Process Variations Based Upon Formula F1

In step C, the standard procedure is to add SOL B (H$_2$O$_2$ and NH$_4$OH) to cause precipitation of a manganese containing compound upon the exterior of the silicic acid particules. In the varied procedure, water is used in place of SOL B, which eliminates the precipitation of the manganese on the silicic acid particles.

TABLE V

| | I (BRIGHTNESS) % | PERSISTENCE $\Sigma\tau$ MILLISECONDS |
|---|---|---|
| Standard Procedure | 100 | 45 |
| Varied Procedure (1) | 89 | 41 |

In step D, the standard procedure is to add ZnO to the product of step C. In the second varied procedure, for F1, ZnO is added with the silicic acid before SOL B in step C. The result is lower brightness and less persistence time.

TABLE VI

| | I (BRIGHTNESS) % | PERSISTENCE $\Sigma\tau$ MILLISECONDS |
|---|---|---|
| Standard Procedure | 100 | 45 |
| Varied Procedure (2) | 90 | 40 |

Particle Size Variation-Silicic Acid

Another variation in the process of making F1 phosphors is to change the starting size of the particles 11 upon which the outer layers are deposited prior to firing.

TABLE VII

| SIZE MICROMETERS | I (BRIGHTNESS) % | PERSISTENCE $\Sigma\tau$ MILLISECONDS |
|---|---|---|
| 10 | 100 | 45 |
| 6 | 102 | 45 |
| 1.2 | 98 | 45 |
| 0.5 | 80 | 41 |
| 0.2 | 55 | 35 |

The size was predetermined by selective sedimentation of FISHER A288 or A945 silicic acid in water. By repeating this process of sedimentation, narrow particle size distributions around a center value on the size distribution curve are obtained.

In Formula F1 preparation, as shown in TABLE VIII below, the use of silicic acid particles 11 can be substituted for in step B by addition of SiO$_2$ particles about 1.0 micrometers in size instead of silicic acid particles about 1.2 micrometers in size.

TABLE VIII

| | I (BRIGHTNESS) % | PERSISTENCE $\Sigma\tau$ MILLISECONDS |
|---|---|---|
| Silicic acid particles | 98 | 45 |
| SiO$_2$ particles | 88 | 38 |

The atmosphere in which firing is performed makes a difference. The preferred atmosphere is nitrogen as compared with air. (TABLE IX)

TABLE IX

| ATMOSPHERE | I (BRIGHTNESS) % | PERSISTENCE $\Sigma\tau$ MILLISECONDS |
|---|---|---|
| Nitrogen | 100 | 45 |
| Air | 89 | 42 |

Firing for too long a period results in decreased brightness of the phosphors 10' for a given persistence level. (TABLE X)

TABLE X

| FIRING TIME AT 1180° C. | I (BRIGHTNESS) % | PERSISTENCE $\Sigma\tau$ MILLISECONDS |
|---|---|---|
| 11 Minutes | 100 | 45 |
| 23 Minutes | 90 | 40 |

Milling of the fired phosphors after complete firing is harmful in that it destroys the physical integrity of the phosphor particles 10'. (TABLE XI)

TABLE XI

| MILLING TIME | I (BRIGHTNESS) % | PERSISTENCE $\Sigma\tau$ MILLISECONDS |
|---|---|---|
| Formula 1: Zero Minutes | 100 | 45 |
| Formula 1: Ten Minutes | 91 | 38 |

TABLE XII below shows that as compared with a commercial P39 phosphor the modified P39 and P1 phosphors in accordance with this invention have tighter tolerances and less fluctuation in persistence time at 80% of peak intensity.

TABLE XII

PERSISTENCE TIME AT 80% OF PEAK INTENSITY

| TUBE NO. | COMMERCIAL P39 TYPE (μsec) | F4 MODIFIED P39 (μsec) | F1 MODIFIED P1 (msec) |
|---|---|---|---|
| 1. | 60 | 400 | 1.6 |
| 2. | 350 | 350 | 1.4 |
| 3. | 500 | 400 | 1.4 |
| 4. | 20 | 350 | 1.6 |
| 5. | 60 | 450 | 1.5 |
| 6. | — | 390 | 1.4 |
| 7. | — | — | 1.46 |
| 8. | — | — | 1.6 |
| Average | 198 msec | 390 μsec | 1.5 msec |

Figure 5:
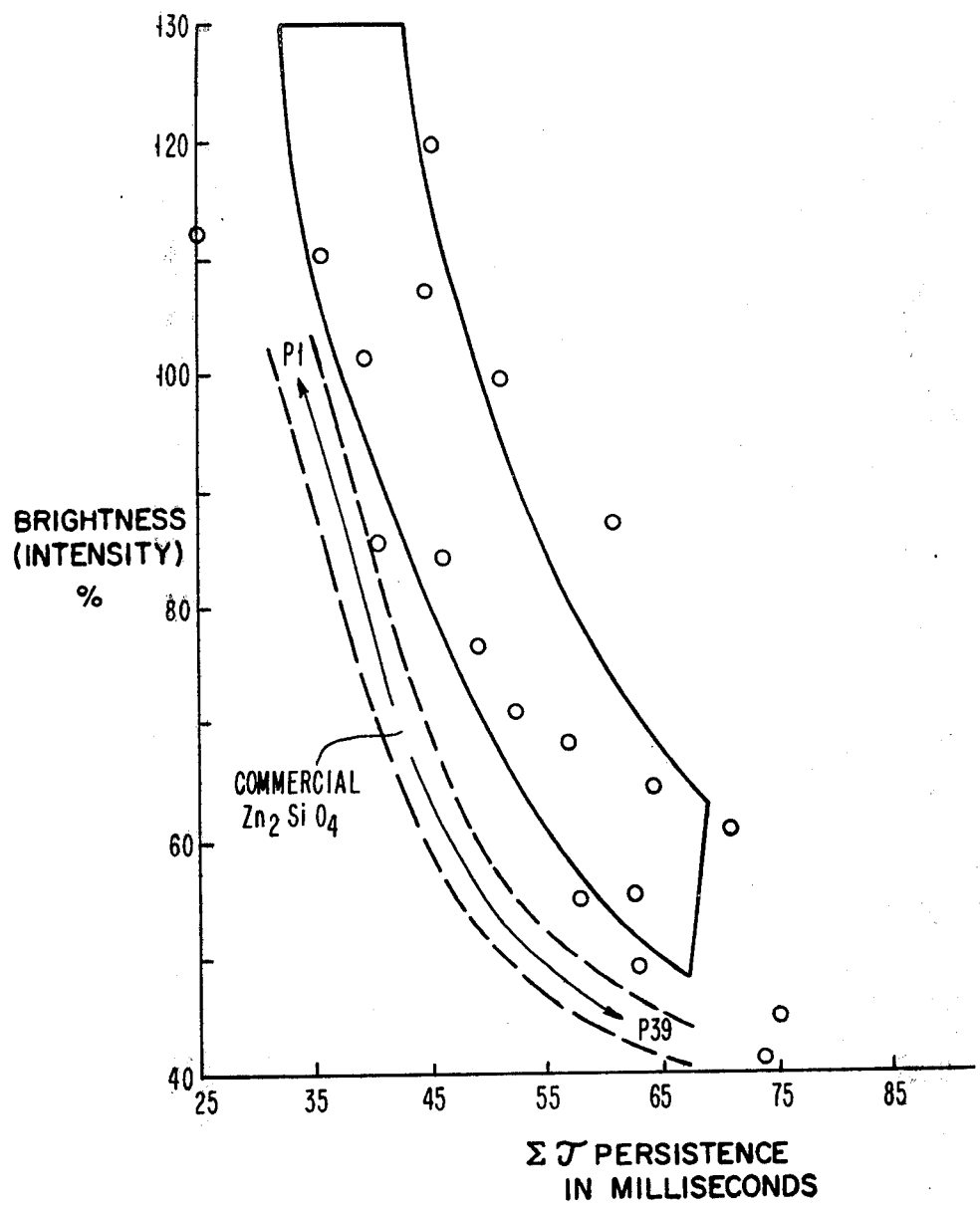
FIG. 5 is a curve of brightness or intensity as a function on persistence for commercially available phosphors as contrasted with phosphors made in accordance with this invention.

FIG. 5 shows the percentage of brightness or intensity (I) of several phosphor materials as a function of persistence ΣE (decay time) in milliseconds. It can be seen that the range for commercial P1 and P39 is to the lower left of the curve as indicated by the label. The samples indicated by circles and generally within the "box" to the upper right of the commercial dotted curves, indicates the data points for the phosphors made in accordance with this invention. Note that there is more brightness for the new phosphors in accordance with this invention for a given persistence requirement, or alternatively, more persistence for a given brightness requirement.

FIG. 6 shows a set of curves for brightness in foot lamberts versus Cathode Current in microamperes. It can be seen that the modified P1 (F4) and modified P39 (F1) curves are consistently far higher than the commercial P39 curve.

FIG. 7.1 is a photomicrograph of particles of commercially available P39 phosphor particles spread on glass slides magnified to the scale of 300 micrometers as indicated. The photomicrographs are made in transmitted light.

FIG. 7.2 is similar photomicrograph of the same P39 phosphor particles as in FIG. 7.1 magnified to the scale of 150 micrometers as indicated. Note the wide range of particle sizes in FIGS. 7.1 and 7.2 and the many small particles below 2 micrometers in size.

FIG. 8.1 is a photomicrograph of the particles of the F1 phosphor made in accordance with this invention from silicic acid, etc., spread on glass slides and magnified to the same scale as FIG. 7.1.

FIG. 8.2 is a similar photomicrograph of the F1 material shown in FIG. 8.1 magnified to the same scale as FIG. 7.2. Note the very small content of particles smaller than 2 micrometers. The average size is 10 micrometers.

Figure 9:
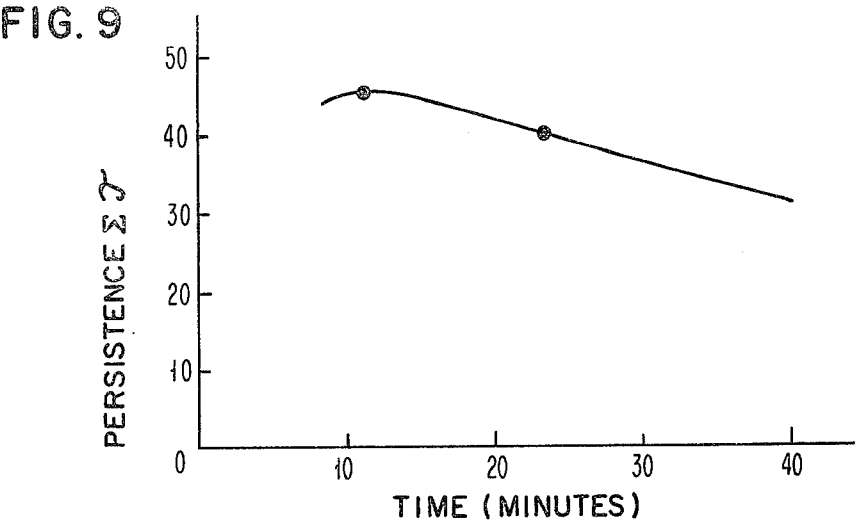
FIG. 9 is a graph of persistence of phosphors in accordance with this invention as a function of time of firing.

FIG. 9 shows the persistence of F1 phosphors which are included in TABLE X. It can be seen that the persistence is degraded after the optimum time of about ten minutes of firing.

Figure 10:
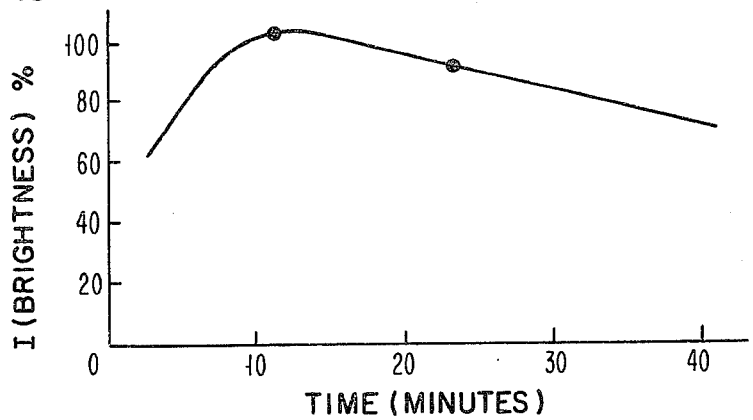
FIG. 10 is a graph of intensity or brightness of phosphors in accordance with this invention as a function of time of firing.

FIG. 10 shows that the brightness of the same F1 phosphor as shown in TABLE X reaches a peak after a firing time of about eleven minutes and that it has been substantially degraded after about twenty-three minutes.

Figure 11:
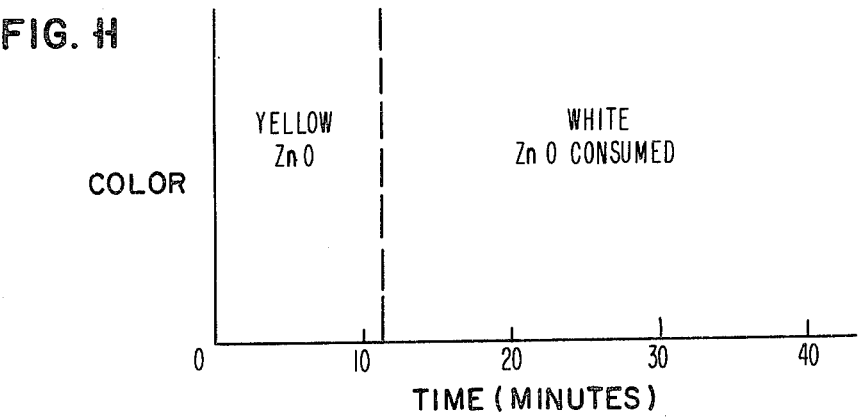
FIG. 11 is a chart indicating color change as a function of time of firing of phoshors made in accordance with this invention.

FIG. 11 is closely related to FIGS. 9 and 10 in that the color of the particles changes from yellow to white when all of the ZnO has been consumed and absorbed into the phosphor particles which are forming with the color changing to white at that time.

Having thus described our invention, what we claim as new and desire to secure by Letters Patent is:

1. An improved zinc silicate phosphor comprising particles with
   an inner core of silicon and oxygen rich material,
   an intermediate region rich in manganese oxides, and
   an outer portion rich in zinc and oxygen.

2. A phosphor in accordance with claim 1 wherein said intermediate region contains magnesium and arsenic.

3. A phosphor in accordance with claim 2 wherein said inner core is rich in silicon dioxide,
   said intermediate region is rich in manganese, magnesium, arsenic acid oxygen, and
   said outer portion is rich in zinc and oxygen.

4. A phosphor in accordance with claims 1, 2 or 3 wherein the combined composition of said inner core, said intermediate region and said outer portion of the phosphor particles comprises compounds in ratios in accordance with the ranges listed as follows:
   $ZnO$: 2 moles
   $SiO_2$: 1.60–1.65 moles
   $MgO$: 0–0.11 moles
   $MnO$: 0.006–0.014 moles
   $As_2O_3$: 285–1120 parts per million.

5. A phosphor in accordance with claims 1, 2 or 3 wherein the combined composition of said inner core, said intermediate region and said outer portion of the phosphor particles comprises compounds in ratios in accordance with the ranges listed below:
   $ZnO$: 2 moles
   $SiO_2$: 1.1–1.75 moles
   $MgO$: 0–0.11 moles
   $MnO$: 0.0025–0.02 moles
   $As_2O_3$: 0–2000 parts per million.

6. A phosphor in accordance with claims 1, 2 or 3 wherein the combined composition of said inner core, said intermediate region and said outer portion of the phosphor particles includes the components in the ratios indicated:
   $ZnO$: 1
   $SiO_2$: 0.55 to 0.875
   $MgO$: 0 to 0.06
   $MnO$: 0.001 to 0.01
   $As_2O_3$: 0–2000 parts per million.

7. A phosphor in accordance with claims 1, 2 or 3 wherein the combined composition of said inner core, said intermediate region and said outer portion of the phosphor particles includes the components in the ratios indicated:
   $ZnO$: 1
   $SiO_2$: 0.8–0.83
   $MgO$: 0–0.06
   $MnO$: 0.003 to 0.007
   $As_2O_3$: 285–1120 parts per million.

8. An improved zinc silicate phosphor comprising particles with
   an inner core of silicon and oxygen rich material,
   an intermediate region rich in manganese oxides, and
   an outer portion rich in zinc and oxygen,
   said phosphor having been a product made by the process of:
   (a) providing particles of silicic acid to sizes on the order of one micrometer and larger,
   (b) mixing said silicic acid particles in an aqueous solution of Mn, Mg and As cations and highly active anions, (c) adding zinc oxide particles to the result of step (b), drying, and (d) firing the product of step (c) whereby a reacted oxide product is produced.

9. A phosphor in accordance with claim 8 wherein said solution in step (b) includes $NH_4OH$.

10. A phosphor in accordance with claim 8 wherein the product of step (b) is oxidized to form a precipitate containing Mn to coat the exterior surface of said silicic acid particles prior to step (c).

11. A phosphor in accordance with claim 8 wherein particles of zinc oxide are applied to provide a coating on said particles in step (c), whereby firing of said particles with said coating inhibits sintering of said particles together during firing in step (d).

12. A phosphor in accordance with claim 8 wherein particles of zinc oxide an order of magnitude smaller than said particles of silicic acid are applied to said particles of silicic acid to provide a coating on said particles of step (b) in step (c), whereby firing of said particles with said coating inhibits sintering of said particles together during firing in step (d).

13. A phosphor in accordance with claim 8 wherein the product of step (b) is oxidized to form a precipitate of $Mn_2O_3 \cdot xH_2O$ to coat the exterior surface of said silicic acid particles prior to step (c).

14. A phosphor in accordance with claim 8 wherein said silicic acid particles are in the size range between about 0.7 micrometer and 10 micrometers, said solution in step (b) comprises $MnSO_4 \cdot H_2O$, $As_2O_3$, $HNO_3$ and magnesium with an anion, and said firing in step (d) being performed for between about 6 and 36 minutes at a temperature on the order of 1180° C.

15. A phosphor in accordance with claim 8 wherein the atmosphere empolyed in step (d) comprises wet nitrogen gas.

16. A phosphor in accordance with claim 8 wherein said aqueous solution in step (b) comprises a solution $A_n$ from the table which follows:

| | SOLUTION $A_n$ | | | |
| | Quantities | | | |
| Components | $A_1$ | $A_2$ | $A_3$ | $A_4$ |
|---|---|---|---|---|
| $H_2O$ (cc) | 13.3 | 13.3 | 13.3 | 13.3 |
| Mg Acetate (g) | 0.79 | 0 | 0.79 | 0 |
| Mg $(NO_3)_2 \cdot 6H_2O$ (g) | 0 | 1.0 | 0 | 0 |
| $NH_4OH$ (cc) | 1.0 | 1.0 | 1.0 | 1.0 |
| $As_2O_3$ (Stir 2 hrs.) (g) | 0.00073 | 0.00073 | 0.0002 | 0.0002 |
| $HNO_3$ (cc) | 1.0 | 1.0 | 1.0 | 1.0 |
| $MnSO_4 \cdot H_2O$ (g) | 0.0324 | 0.0324 | 0.0816 | 0.0816 |
| Stir (hrs.) | 2 | 2 | 2 | 2 |

17. A method in accordance with claim 8 wherein said aqueous solution in step (b) comprises a solution $A_n$ from the table which follows:

| | SOLUTION $A_n$ | | | |
| | Quantities | | | |
| Components | $A_1$ | $A_2$ | $A_3$ | $A_4$ |
|---|---|---|---|---|
| $H_2O$ (cc) | 13.3 | 13.3 | 13.3 | 13.3 |
| Mg Acetate (g) | 0.79 | 0 | 0.79 | 0 |
| Mg $(NO_3)_2 \cdot 6H_2O$ (g) | 0 | 1.0 | 0 | 0 |
| $NH_4OH$ (cc) | 1.0 | 1.0 | 1.0 | 1.0 |
| $As_2O_3$ (Stir 2 hrs.) (g) | 0.00073 | 0.00073 | 0.0002 | 0.0002 |
| $HNO_3$ (cc) | 1.0 | 1.0 | 1.0 | 1.0 |
| $MnSO_4 \cdot H_2O$ (g) | 0.0324 | 0.0324 | 0.0816 | 0.0816 |
| Stir (hrs.) | 2 | 2 | 2 | 2 | and the product of step (b) is oxidized to form a precipitate containing Mn with addition of solution B which follows:

| SOLUTION B | |
|---|---|
| $NH_4OH$ (cc) | 3.5 |
| $H_2O_2$ (cc) | 1.5 |

* * * * *

UNITED STATES PATENT AND TRADEMARK OFFICE
CERTIFICATE OF CORRECTION

PATENT NO. : 4,440,831  Page 1 of 2
DATED : 4/3/84
INVENTOR(S) : James M. Brownlow and Ifay F. Chang It is certified that error appears in the above-identified patent and that said Letters Patent is hereby corrected as shown below:

Column 3, line 68 "$MnSO_4.H_2O$" should read -- $MnSO_4 \cdot H_2O$ --.

Column 4, line 15 "$Mg(NO_3).6H_2O(g)$" should read -- $Mg(NO_3) \cdot 6H_2O(g)$ --.

line 19 "$MnSO_4.H_2O(g)$" should read -- $MnSO_4 \cdot H_2O(g)$ --.

Column 5, line 19 "$Mn_2O_3.xH_2O$" should read -- $Mn_2O_3 \cdot xH_2O$ --.

line 20 "$SiO_2.xH_2O$" should read -- $SiO_2 \cdot xH_2O$ --.

line 33 "preferaly" should read --preferably--.

Column 6, line 6 "$MnSO_4.H_2O$" should read -- $MnSO_4 \cdot H_2O$ --.

line 9 "$Mn_2O_3.xH_2O$" should read -- $Mn_2O_3 \cdot xH_2O$ --.

line 36 "$Mg(NO_3)_2.6H_2O$" should read -- $Mg(NO_3)_2 \cdot 6H_2O$ --.

line 41 "$Zn_2Si_{1.5}O_5$" should read -- $Zn_2Si_{1.5}O_5$ --.

Column 7, line 37 "$Mg(NO_3)_2.6H_2O(g)$" should read -- $Mg(NO_3)_2 \cdot 6H_2O(g)$ --.

line 42 "$MnSO_4.H_2O(g)$" should read -- $MnSO_4 \cdot H_2O(g)$ --.

Column 8, line 51 "$SiO_2.H_2O(g)$" should read -- $SiO_2 \cdot H_2O(g)$ --.

UNITED STATES PATENT AND TRADEMARK OFFICE
CERTIFICATE OF CORRECTION

PATENT NO. : 4,440,831

DATED : 4/3/84

INVENTOR(S) : James M. Brownlow and Ifay F. Chang

It is certified that error appears in the above-identified patent and that said Letters Patent is hereby corrected as shown below:

Column 9, line 37  "particules" should read --particles--.

Column 11, line 19  after "$\Sigma$" delete "E" and insert -- $\tau$ --.

Column 12, line 14  after "arsenic" delete "acid" and insert --and--.

Column 13, line 25  "$Mn_2O_3.xH_2O$" should read -- $Mn_2O_3 \cdot xH_2O$ --.

line 30  "$MnSO_4.H_2O$" should read -- $MnSO_4 \cdot H_2O$ --.

line 36  "empolyed" should read --employed--.

Column 14, line 8  "$Mg\ (NO_3)_2.6H_2O(g)$" should read -- $Mg\ (NO_3)_2 \cdot 6H_2O(g)$ -- line 12  "$MnSO_4.H_2O(g)$" should read -- $MnSO_4 \cdot H_2O(g)$ --.

line 24  "$Mg\ (NO_3)_2.6H_2O(g)$" should read -- $Mg\ (NO_3)_2 \cdot 6H_2O(g)$ -- line 29  "$MnSO_4.H_2O(g)$" should read -- $MnSO_4 \cdot H_2O(g)$ --.

Signed and Sealed this

Third Day of December 1985

[SEAL]

Attest:

DONALD J. QUIGG

Attesting Officer

Commissioner of Patents and Trademarks